Patented Feb. 11, 1941

2,231,181

UNITED STATES PATENT OFFICE 2,231,181

PROCESS OF REDUCING FERRIC COMPOUNDS

Maxwell J. Brooks, New York, N. Y., assignor to General Chemical Company, New York, N. Y., a corporation of New York No Drawing. Application May 21, 1938, Serial No. 209,379

8 Claims. (Cl. 23—126)

This invention relates to the reduction of ferric compounds.

Reduction of ferric compounds in solution has been previously carried out in a number of ways. For instance, ferric iron may be reduced by treatment with nascent hydrogen, which may be generated by addition of a metal such as iron or zinc to an acid solution of the ferric compound. Frequently in industrial operations it is desired to reduce ferric iron in acid solution to the ferrous state. In such cases the addition of metals such as iron or zinc to the solution is generally regarded as undesirable for the reasons that in the case of the addition of iron, the iron content of the solution is thereby increased, and in the case of the addition of metals such as zinc, the solution becomes contaminated with this metal. Furthermore, the acid present in the solution is consumed by reaction with the metal. It has also been proposed to carry out the reduction electrolytically, but this method involves expensive and elaborate equipment.

Ferric iron may also be reduced to the ferrous condition by passing sulfur dioxide gas into a neutral or slightly basic solution of a ferric compound. However, reduction of ferric compounds to the ferrous state with sulfur dioxide is substantially incomplete in solutions containing appreciable amounts of free acid or compounds of elements other than iron, or both.

I have now made the surprising discovery that ferric compounds may be substantially completely reduced by sulfur dioxide in solutions containing appreciable amounts of free acid or of compounds of elements other than iron, or both, by adding to such solutions, before passage of the sulfur dioxide therethrough, a relatively small amount of activated carbon.

The process of this invention may be carried out by adding a relatively small amount of activated carbon to a solution of a ferric compound, which may contain free acid or compounds of elements other than iron, or both, and then passing sulfur dioxide gas into the solution until the reduction of the ferric compound is substantially complete. The amount of activated carbon added to the solution will vary to some extent, depending on the concentration of the ferric compound to be reduced and the amount of free acid and compounds of elements other than iron present in the solution. The reduction may also be carried out by causing a solution of the ferric compound to flow through a vessel packed with activated carbon countercurrent to a stream of sulfur dioxide gas. The sulfur dioxide gas used for the reduction need not be 100% $SO_2$, but any available gas containing sulfur dioxide may be used; gas containing 8% $SO_2$ which is available in many industrial processes gives excellent results. The sulfur dioxide is oxidized to sulfuric acid which remains in the reduced solution, and may be recovered in any suitable manner if desired. The reduction may be carried out at any convenient temperature, e. g. from room temperature (about 20°–30° C.) to the boiling point of the solution. The activated carbon used may be recovered from the solution by permitting it to settle and decanting, or it may be recovered by filtration. If the reduction is carried out using a carbon-packed tower, as described above, the charge of activated carbon may remain continuously in use.

The above process for the reduction of ferric compounds has been found to be particularly suitable for use in the production of titanium pigments. In the manufacture of these pigments the customary practice is to digest a titanium ore known as ilmenite with sulfuric acid, whereby a solid cake is obtained containing titanium sulfate and varying amounts of ferric and ferrous sulfates. The titanium sulfate is then hydrolyzed to precipitate hydrated titanium oxides. Before the hydrolysis of the sulfate, however, it is desirable to convert substantially all the iron to the ferrous condition so that a pure white titanium oxide pigment may eventually be obtained. It has been found the reduction may be advantageously accomplished by adding activated carbon to the solution and passing sulfur dioxide therethrough. In carrying out this reduction, the temperature of the solution should be sufficiently high to prevent crystallization of any ferrous sulfate; e. g., a temperature of about 30° C. is suitable.

In the following examples the reduction of ferric iron to the ferrous condition in the presence of free sulfuric acid and titanium salts is described. Amounts are given in parts by weight.

*Example 1.*—To 100 parts of a solution containing 6.8% ferric sulfate, 4.3% ferrous sulfate, 2.64% titanic sulfate and 10% free sulfuric acid, was added 0.06 part of activated carbon made by activating charcoal produced from wood or vegetable products. 100% $SO_2$ gas was then passed through the solution for two hours, the temperature being between about 25° and about 30° C. It was found that by this treatment over 98% of the ferric sulfate had been reduced to ferrous sulfate. When the same solution was treated in the absence of activated carbon with sulfur dioxide for the same time and at the same temperature, only 2.9% of the ferric sulfate was reduced.

*Example 2.*—To 750 parts of a liquor containing 6.8% ferric sulfate, 4.3% ferrous sulfate, 2.64% titanium sulfate and 10% free sulfuric acid with 120 parts of basic ferric sulfate and titanyl sulfate in suspension, was added 0.5 part of activated carbon made by activating charcoal produced from wood or vegetable products. 100% $SO_2$ gas was then passed through the slurry at a temperature of 30° C. for two hours. It was found after this treatment 97.9% of the iron in solution was in the form of ferrous iron.

*Example 3.*—To 750 parts of the slurry described in Example 2 was added 0.5 part of activated carbon made by activating charcoal produced from wood or vegetable products. A gas containing 7.7% $SO_2$ and 92.3% air by volume was then passed through the solution at a rate of 5 cubic feet per hour for three hours at a temperature of 25° C. It was found after this treatment 90% of the ferric iron in solution was reduced to the ferrous condition.

*Example 4.*—Ilmenite was digested with sulfuric acid and the resulting cake was broken up and dissolved in water. The solution assayed 8.08% ferrous sulfate, 5.10% ferric sulfate, 20.55% titanium sulfate and 9.50% free sulfuric acid. To 100 parts of this liquor was added 0.18 part of activated carbon made by activating charcoal produced from wood or vegetable products and 100% $SO_2$ gas was then passed therethrough at a temperature of 30° C for two hours. 90% of the ferric sulfate was reduced to ferrous sulfate by this treatment. When the same solution was treated by passing sulfur dioxide gas therethrough at the same temperature and for the same time in the absence of activated carbon, only 3.1% of the total ferric iron content was reduced.

*Example 5.*—The solution described in Example 3 was permitted to percolate through a tower packed with finer than 30-mesh activated carbon made by activating charcoal from wood or vegetable products and 100% $SO_2$ gas was passed up through the tower. The temperature in the tower was about 30° C. 93% of the ferric iron content of the solution was reduced to ferrous iron by this treatment.

It will be noted from the above description that my invention provides an economical process for reducing ferric compounds in solutions containing appreciable amounts of free acid, compounds of elements other than iron, or both. By the process of this invention reduction is accomplished without increasing the contamination of the solution with metallic compounds. Furthermore, this process does not involve the use of expensive and elaborate equipment as does the electrolytic process for the reduction of oxidized compounds, but may be practiced using ordinary industrial apparatus.

Since certain changes may be made in carrying out the above process without departing from the scope of the invention, it is intended that all matter contained in the above description shall be interpreted as illustrative and not in a limiting sense.

I claim:
1. A process for the reduction of a ferric compound which comprises passing sulfur dioxide into a solution containing a ferric compound in the presence of substantially pure carbon in activated form.

2. In a process for the reduction of a ferric compound in a solution containing appreciable amounts of free acid, the improvement which comprises passing sulfur dioxide into said solution in the presence of activated charcoal of vegetable origin.

3. In a process for the reduction of a ferric compound in a solution containing appreciable amounts of compounds of elements other than iron, the improvement which comprises passing sulfur dioxide into said solution in the presence of substantially pure carbon in activated form.

4. In a process for the reduction of ferric compounds in a solution containing appreciable amounts of free acid and compounds of elements other than iron, the improvement which comprises passing sulfur dioxide into said solution in the presence of activated charcoal of vegetable origin.

5. In a process for the reduction of ferric sulfate in a solution containing free sulfuric acid and titanium sulfate, the improvement which comprises passing sulfur dioxide into said solution in the presence of substantially pure carbon in activated form.

6. In a process for the reduction of ferric sulfate in a solution containing free sulfuric acid and titanium sulfate, the improvement which comprises passing said solution through a vessel packed with substantially pure carbon in activated form and passing sulfur dioxide gas through the vessel counter-current to the solution.

7. In the process of manufacturing titanium oxide pigments involving digesting ilmenite ore with sulfuric acid and dissolving the resulting cake in water, the improvement which comprises reducing the ferric compounds present in the aqueous titanium solution by passing sulfur dioxide gas therethrough in the presence of activated charcoal of vegetable origin.

8. In the process of manufacturing titanium oxide pigments involving digesting ilmenite ore with sulfuric acid and dissolving the resulting cake in water to obtain a solution containing about 20% titanium sulfate and about 10% free sulfuric acid, the improvement which comprises reducing the ferric compounds present in the aqueous titanium solution by passing sulfur dioxide gas therethrough in the presence of substantially pure carbon in activated form.

MAXWELL J. BROOKS.